Sheet 1 — 3 Sheets
W. T. Duvall.
Separating Gold. e.t.c.
Nº 69784                         Patented Oct. 15, 1867
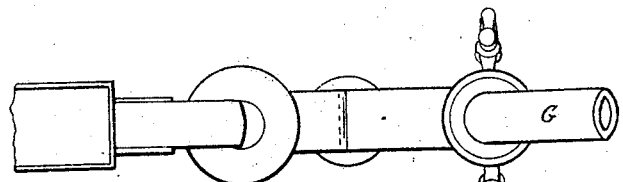
Fig. 2.                          Fig. 1.
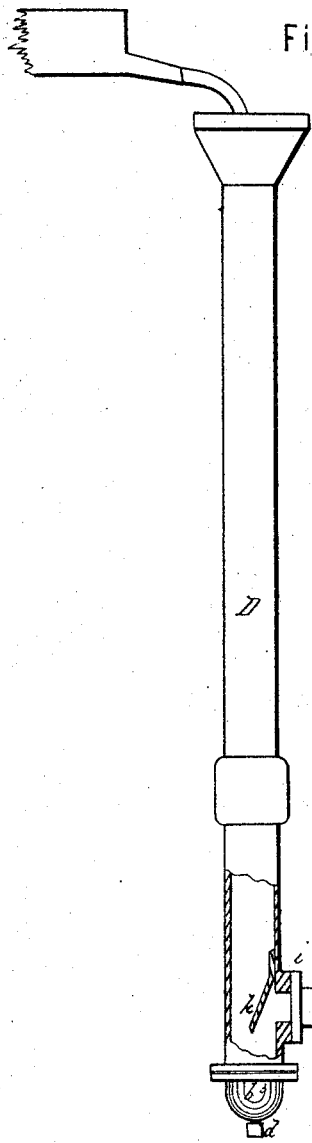
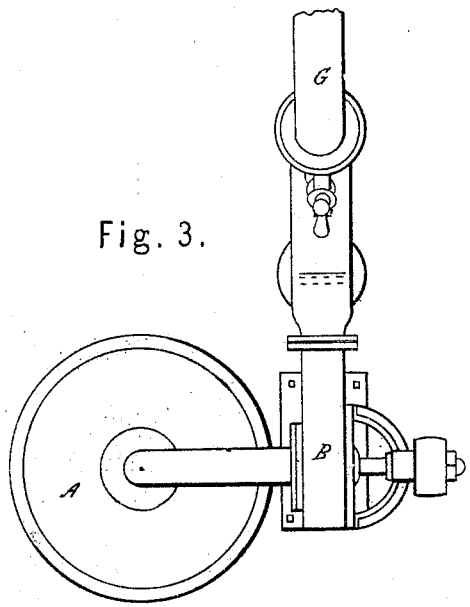
Fig. 3.
Witnesses.                       Inventor.
W. Morris Smith                  Attys Brown, Coombs & Co
Sydney E. Smith                  for Wm T Duvall Sheet 2 - 3 Sheets

W. T. Duvall.
Separating Gold. etc.

Nº 69784. Patented Oct. 15, 1867

Witnesses.
W. Morris Smith
Sydney E. Smith

Inventor.
Wm T. Duvall
by Attys. Brown Coombs & Co

Sheet 3 – 3 Sheets
W. T. Duvall.
Separating Gold.e.t.c.
N° 69784      Patented Oct.15, 1867.
Fig. 7.      Fig. 8.
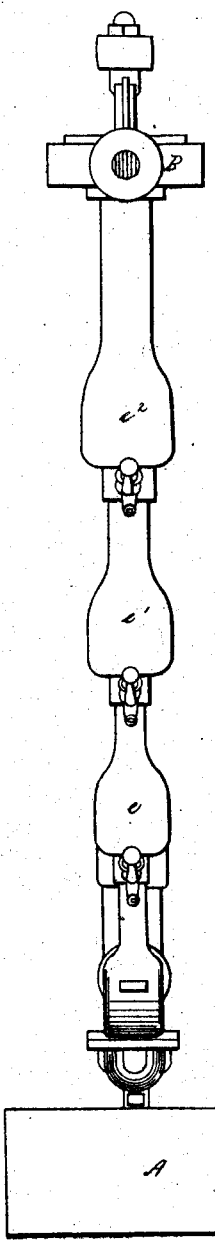
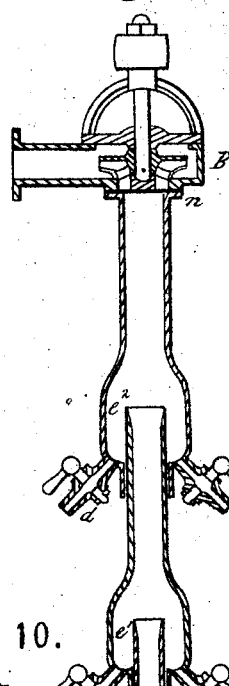
Fig. 10.
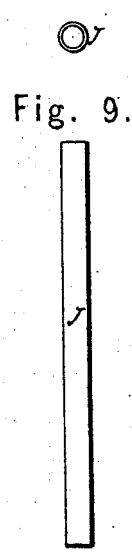
Fig. 9.
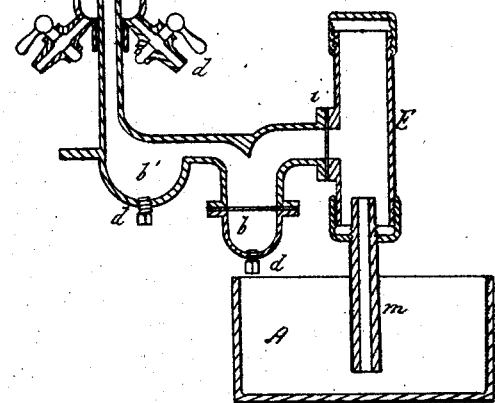
Witnesses      Inventor.
W. Morris Smith      Wm T Duvall
Sydney E. Smith      by Attys Brown, Coombs & Co

United States Patent Office.

WILLIAM T. DUVALL, OF GEORGETOWN, DISTRICT OF COLUMBIA.

Letters Patent No. 69,784; dated October 15, 1867.

---

IMPROVED APPARATUS FOR SEPARATING GOLD, &c.

---

The Schedule referred to in these Letters Patent and making part of the same.

---

TO ALL WHOM IT MAY CONCERN:

Be it known that I, WILLIAM T. DUVALL, of Georgetown, in the county of Washington, and District of Columbia, have made certain new and useful improvements in "Apparatus for Washing Gold or other Substances;" and I do hereby declare that the following is a full, clear, and exact description thereof, reference being had to the accompanying drawings, through letters of reference marked thereon, forming part of this specification, in which—

Figure 1 represents a top view of my apparatus as applied for extracting gold, &c., from the flow of a branch.

Figure 2 is a side view of the same, a part being shown in section.

Figure 3 is a top view of a similar apparatus as combined with a centrifugal pump for forcing an upward current therethrough.

Figure 7 is an end elevation of the same

Figure 8 is a vertical longitudinal section, taken through the centre of fig. 7.

Figures 9 and 10 show an elevation and end view of a suction pipe, to take the place of the lower connection, shown in fig. 8.

The same letters of reference occurring in the several figures indicate corresponding parts.

Figure 4:
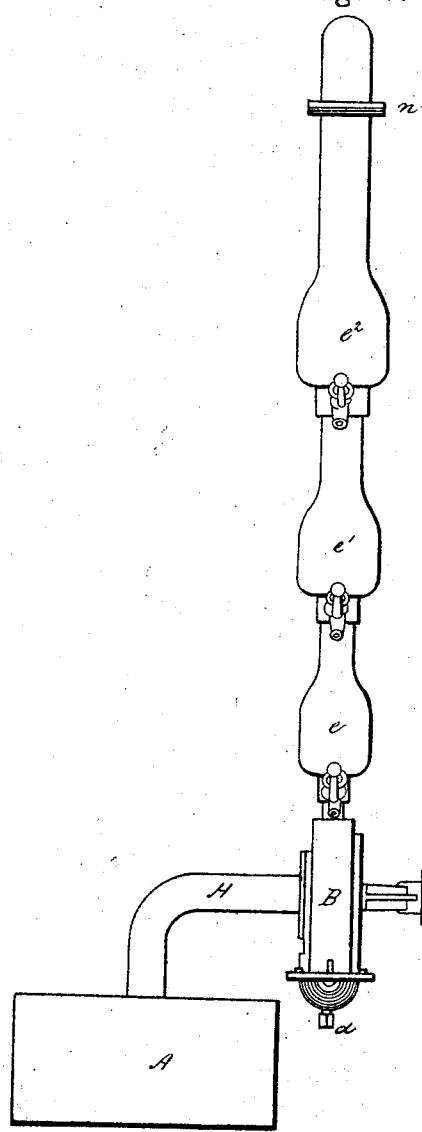
Figure 4 is an end elevation of the same.

My invention relates to that class of machinery used for separating deposits of gold, or precious metals, &c., found in the beds of rivers or other water-courses; and it consists, first, in a peculiar construction and arrangement of deposit-chambers or traps, forming a series, each successive one of which having a larger discharge-orifice than the preceding one, whereby the velocity of the current is gradually decreased, and the heavier particles are first separated, then those of less specific gravity, and lastly the finest are deposited; it also consists in the combination, with such series, of a centrifugal or other suitable pump, of such character as to serve the twofold purpose of forcing the current, and at the same time of agitating the earthy liquid, so as to cause the perfect separation of all the heavier particles; furthermore, it consists in the arrangement of the pump at the top of such series of traps or chambers, and a modification of the lower end of the apparatus, whereby it may be operated by producing a vacuum therein, and may be applied to raise the rich deposits directly from the beds of streams, or from their lodgments between rocks therein, or from other otherwise inaccessible places; and further, in the application to said series of chambers or traps of an attachment, whereby a column or head of water, supplied thereto from a branch known to contain rich deposits, said deposits may be separated therefrom by the natural flow of the water through the apparatus; and it also consists in a peculiar construction of said deposit-chambers, whereby the apparatus is rendered exceedingly portable, so that it may be conveyed from place to place and set up for operation in a very short space of time.

To enable others to make and use my invention I will proceed to describe its construction and operation by referring to the drawings, in which A represents a tub or reservoir, made of any suitable material, into which the earthy products of the stream are caused to flow, or are otherwise deposited. In this vessel is also placed a quantity of mercury. Above or conveniently situated with regard to this reservoir is a centrifugal pump, B, the suction pipe H of which extends downward into said reservoir nearly to the surface of the mercury, or this vessel may be dispensed with, and the apparatus be worked on board a vessel or boat, by extending the suction pipe H down to the bed of the stream, by passing it over or through the side of said vessel. As this pump may be of any known construction, any further description of it here is deemed unnecessary, further than to say that the centrifugal principle is preferred, from the fact of its requiring no valves, which would be liable to obstruction, and at the same time it has the effect of beating, as it were, and thus separating the earthy particles as they pass through it, and are discharged at the outlet C, where the stream comes in contact with a deflector, $a$, which directs it downward into a pocket, $b$. This pocket is nearly filled with mercury which seizes the heaviest particles of precious metals, whilst those of less specific gravity are carried forward by the force of the current. A secondary pocket, $b'$, serves to receive the overflow of mercury from pocket $b$ as it is displaced by the deposit therein of metal of greater specific gravity. The current thence taking an upward direction discharges into the chamber $e$, which surrounds the nozzle $c$. In this chamber is also placed a quantity of mercury. Here the velocity of the current is checked by the further extension of the pipe, through which it passes, being of larger area, by which means those particles of the next greatest specific gravity are caused to diverge outwardly from the current and fall into the chamber or trap $e$, and, as the current continues upward, the same effect is produced on its passage through the chamber $e^1$, (the velocity of the current being again slackened,) and so again on its passage through the chamber $e^2$, where the velocity is so far reduced as to be able only to discharge the muddy water deprived of all its riches. Each of these chambers $e\ e^1\ e^2$, and pockets $b$ and $b^1$, on stopping the above-described operation, will be charged with an amalgam of gold or other precious metals and mercury, which may be drawn off through suitable stop-cocks or plugs $d$, and after re-charging the several chambers with mercury the operation may be resumed as before.

The arrangements represented in the other figures on the drawing are but modifications of the same apparatus, as, for instance, that represented in figs. 1 and 2 is adapted to receive a stream from a mountain side or other elevation, in which case I detach the pump from the other portion of the apparatus by unscrewing the flange $i$ and attaching in place thereof the funnel-mouthed pipe D, which extends to a greater elevation than the discharge orifice $h$ of the other portion of the apparatus, so as to cause its contents to flow therethrough. This pipe D is of larger diameter than its discharge, and is provided, at its lower end, with a pocket, $b^3$, which is charged with mercury, and operates the same as the pocket $b$, before described. It is also provided with a diaphragm, $k$, dividing the area of its cross-section at the level of its discharge orifice, so as to cause the current to pass downward into and through the pocket $b^3$, before it reaches the pocket $b$, and there deposit the heavier portion of its precious metals. The operation of this apparatus, thenceforward, is the same as that already described.

Figure 6:
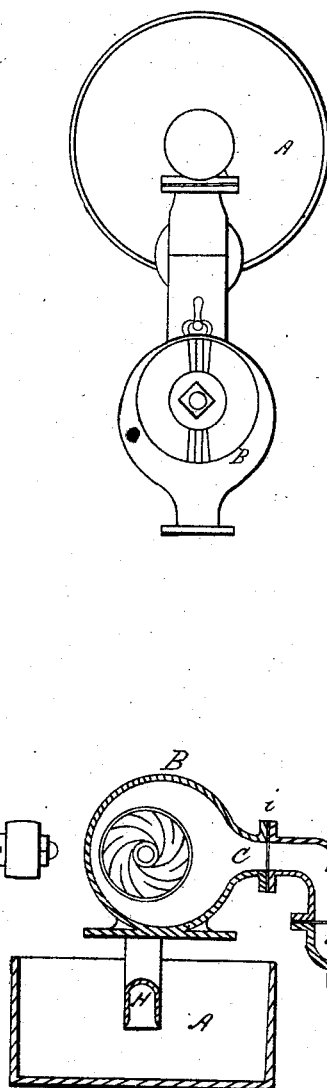
Figure 6 is a top view, with the pump arranged at the upper end to operate it by vacuum.
Figure 5:
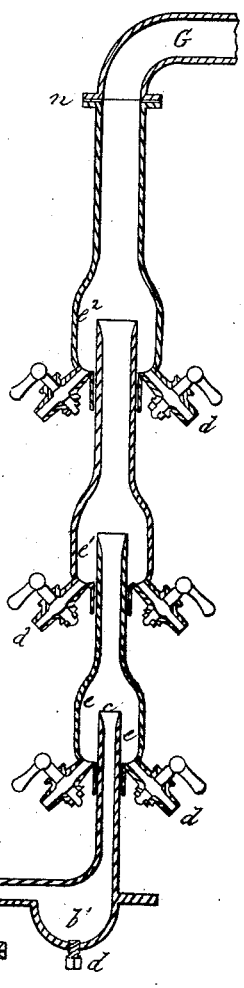
Figure 5 is a vertical longitudinal section thereof, taken through the centre of fig. 4.

Figures 6, 7, and 8 represent another modification of my apparatus, adapted for use in positions where it would be difficult to operate the pump at the lower portion of the apparatus, in which case I attach a vertical chamber, E, to the flange $i$; said chamber being provided with a suction pipe, $m$, the upper end of which extends into it, forming an annular chamber or trap therein similar to those formed in the chambers $e$, and which is charged with mercury and operates in the same manner as said chambers $e$. I then attach the pump B, by its central or suction orifice, to the flange $n$ at the upper end of the series of chambers $e\ e^1\ e^2$, having first removed the discharge elbow pipe G, and the suction pipe H, which were previously attached as represented in figs. 3, 4, and 5. In this arrangement the apparatus is operated by producing a vacuum therein, and thus causing a flow through it.

A still further modification is contemplated in case it is desired to explore the beds of streams or among rocks. I detach the lower portion from the chamber $e$ and substitute therefor a straight suction pipe, J, which, entering the same distance into said chamber, forms a corresponding trap therein, and may be used to try the beds or other new localities by operating the pump on top, as described in the last-named arrangement.

It may be proper to remark here that the series of chambers $e$ may be increased or diminished in number, as circumstances may require, according to the richness of the deposit. I may further add that it is apparent that this principle, of separating particles of varying specific gravity, may be operated by air, or the like, with the same effect as with water, and may be used for separating grain and various other commodities, to which purposes I intend to apply it, and which may constitute subjects of additional patents.

Having thus described my invention, what I claim as new, and desire to secure by Letters Patent, is—

1. The series of chambers or traps $e$, so constructed and arranged that greater freedom of egress is afforded in each successive chamber, whereby the velocity of the current is reduced, and the heavier particles are deposited successively therein, according to their specific gravity, substantially as and for the purposes set forth.

2. In combination with said series of chambers $e$ a centrifugal or other suitable pump, to force the current, and at the same time to agitate the earthy liquid, substantially as and for the purposes specified.

3. The arrangement of the pump at the top of said series of chambers, so as to operate the apparatus by producing a vacuum therein, essentially as and for the purposes described.

4. The arrangement and combination of the pump and the series of chambers $c$, as shown in fig. 8, with the straight suction pipe J, essentially as and for the purpose set forth.

5. In combination with said series of chambers $e$, I claim the pipe D, for operating by a column or head of water, substantially as described.

6. I claim the chambers $e$, constructed in separate parts, as represented, the nozzle of each protruding into the chamber of the next, forming annular receptacles, substantially as and for the purposes specified.

WM. T. DUVALL.

Witnesses:
  SYDNEY E. SMITH,
  W. MORRIS SMITH.